(12) United States Patent
Green

(10) Patent No.: US 7,898,395 B2
(45) Date of Patent: Mar. 1, 2011

(54) METHOD AND APPARATUS FOR DETECTING RADIO FREQUENCY SIGNALS

(75) Inventor: Samuel I. Green, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 384 days.

(21) Appl. No.: 12/017,224

(22) Filed: Jan. 21, 2008

(65) Prior Publication Data

US 2009/0184819 A1    Jul. 23, 2009

(51) Int. Cl.
*G08B 3/10* (2006.01)
(52) U.S. Cl. .................................................... 340/384.7
(58) Field of Classification Search ............... 340/384.7, 340/540, 505, 539.11, 539.21; 455/226.2
See application file for complete search history.

(56) References Cited

U.S. PATENT DOCUMENTS

| | | | |
|---|---|---|---|
| 5,729,335 A | 3/1998 | Green | |
| 2006/0012476 A1* | 1/2006 | Markhovsky et al. | 340/539.32 |
| 2006/0148423 A1* | 7/2006 | Sharpe | 455/90.1 |
| 2006/0258320 A1* | 11/2006 | Huang | 455/334 |
| 2008/0007404 A1* | 1/2008 | Albert et al. | 340/552 |

OTHER PUBLICATIONS

"Report on Electromagnetic Compatibility Between Passenger Carried Portable Electronic Devices (PEDS) and Aircraft Systems", Nov. 2003, The European Organisation for Civil Aviation Equipment, Paris, France, pp. 77-79.
"0.1 GHz to 2.5 GHz 70 dB Logarithmic Detector/Controller AD8313", Analog Devices, 2004, pp. 1-24.
"LM31A/LM231/LM331A/LM331 Precision voltage-fo-Frequency Converters" National Semiconductor, Apr. 2006, pp. 1-15.
Green, "Bit error rate test accessory makes errors audible", Dec. 2001 Review of Scientific Instruments, vol. 72, No. 12, pp. 4472-4473.
U.S. Appl. No. 12/242,175, filed Sep. 30, 2008, Green et al.

* cited by examiner

*Primary Examiner* — Phung Nguyen
(74) *Attorney, Agent, or Firm* — Yee & Associates, P.C.; Clifford G. Cousins

(57) ABSTRACT

A method and apparatus for sensing radio frequency signals. A radio frequency strength sensing apparatus converts a sensed radio frequency signal to an audible tone. The apparatus comprises a radio frequency detector, a voltage to frequency converter, and a speaker system. The radio frequency detector is capable of detecting radio frequency signals over a selected frequency range with different signal strengths and capable of outputting a logarithmic voltage that varies with signal amplitude change. The voltage-to-frequency converter is connected to the radio frequency detector and is capable of producing an electrical signal waveform in the audio frequency range to generate the audible tone. The speaker system is connected to the voltage-to-frequency converter circuit, wherein the speaker system outputs the audible tone, with pitch of the tone related to the strength of the radio frequency signal.

17 Claims, 5 Drawing Sheets

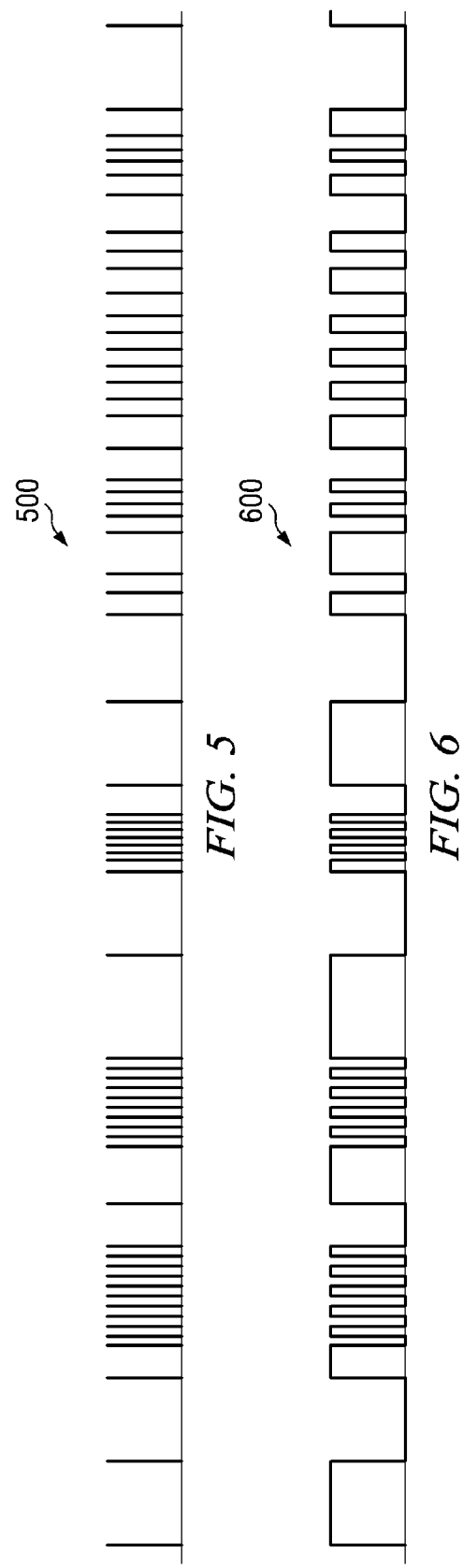

US 7,898,395 B2

METHOD AND APPARATUS FOR DETECTING RADIO FREQUENCY SIGNALS

BACKGROUND INFORMATION

1. Field

The present disclosure relates generally to detecting radio frequency signals and in particular to a method and apparatus for detecting the presence and strength of a radio frequency signal. Still more particularly, the present disclosure relates to a method and apparatus for a portable radio frequency field strength sensing apparatus.

2. Background

The use of mobile phones and other wireless devices has become pervasive in today's society. A mobile phone is a portable electronic device used for mobile communication. In addition to providing voice communications, a mobile phone also may provide additional services, such as text messaging, email, and Internet access. Mobile phones have become a key means for allowing people to communicate with each other. Some users only have mobile phones and do not have landline phones.

With this increased use, social discourtesy may occur in various situations. For example, ringing phones and conversations during funerals, weddings, and in the classroom are some examples of events and places where mobile phone use may be discourteous. Other places in which mobile phone use may be discourteous or prohibited from use include, for example, libraries, movie theaters, court rooms, and on aircraft.

One solution to undesired mobile phone use includes jamming mobile phone signals or preventing signals from penetrating a particular room or area in which mobile phone use is undesirable. With respect to mobile phone use on an aircraft, this type of use is typically prohibited due to possible interference with radio navigation and communication signals on aircraft. For example, some airlines may not allow the use of mobile phones or other devices that generate radio frequency signals from before takeoff until after landing.

Other solutions to undesired mobile phone use include identifying mobile phone users who are actively in conversations or sending messages. Equipment such as spectrum analyzers may be used to detect the use of devices that generate radio frequency signals. When a user of a mobile phone or other radio frequency generation device is identified, the user may then be asked to cease such usage.

SUMMARY

The different advantageous embodiments provide a method and apparatus for sensing radio frequency signals. In one advantageous embodiment, a radio frequency strength sensing apparatus converts a sensed radio frequency signal to an audible tone. The radio frequency strength sensing apparatus comprises a radio frequency detector, a voltage-to-frequency converter circuit, and a speaker system. The radio frequency detector is capable of detecting radio frequency signals over a selected frequency range with different signal strengths and capable of outputting a logarithmic voltage that varies with signal amplitude change. The voltage-to-frequency converter circuit is connected to the radio frequency detector and is capable of producing an electrical signal waveform in the audio frequency range to generate the audible tone. The speaker system is connected to the voltage-to-frequency converter circuit, wherein the speaker system outputs the audible tone.

In another advantageous embodiment, an apparatus comprises a radio frequency detector, and a voltage to frequency converter. The radio frequency detector is capable of detecting radio frequency signals over a selected frequency range with different signal strengths and is capable of outputting a logarithmic voltage that varies with signal amplitude change. The voltage-to-frequency converter is connected to the radio frequency detector and is capable of producing an audible tone.

In still another advantageous embodiment, a method is used to detect radio frequency signals. A radio frequency signal is detected within a selected frequency range to form a detected signal. A logarithmic voltage is generated that varies with signal amplitude change to form an output voltage. The output voltage is converted into an audible signal indicating a presence and strength of the radio frequency signal.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 5 is a train of frequency pulses in accordance with an advantageous embodiment incorporating a voltage-to-frequency converter with a pulsed output;

FIG. 6 is an example of an output waveform in accordance with an advantageous embodiment incorporating a voltage-to-frequency converter with a symmetrical output waveform;

DETAILED DESCRIPTION

Figure 1:
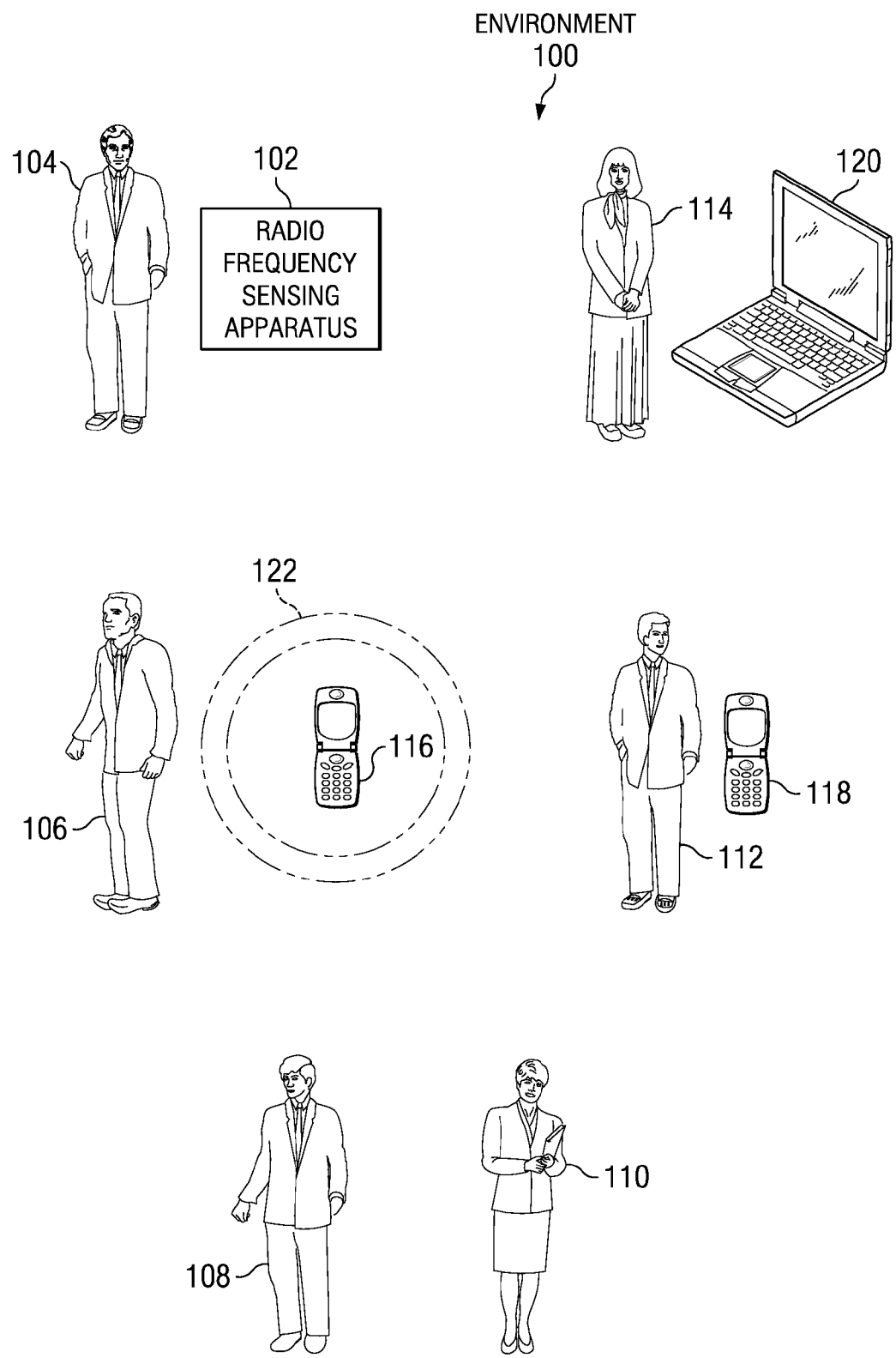
FIG. 1 is an illustration of an environment in which a radio frequency strength sensing apparatus may be used in accordance with an advantageous embodiment.

With reference now to the figures and in particular with reference to FIG. 1, an illustration of an environment in which a radio frequency signal strength sensing apparatus may be used is depicted in accordance with an advantageous embodiment. In this example, radio frequency (RF) sensing apparatus 102 is a portable device operated by user 104. Radio frequency sensing apparatus 102 may be used to identify users in environment 100 who may have radio frequency generating devices. In this example, users 106, 108, 110, 112, and 114 are present within environment 100. User 106 has mobile phone 116, user 112 has mobile phone 118, and user 114 has laptop computer 120.

In the different advantageous embodiments, radio frequency sensing apparatus 102 may be used to detect radio frequency transmissions generated by radio frequency generating devices, such as mobile phone 116, mobile phone 118, and laptop computer 120. Of course, radio frequency sensing apparatus 102 may be used to detect other radio frequency devices, such as Bluetooth headsets, personal digital assistants with wireless communications units, short range radio transmitters, and other devices generating radio frequency signal transmissions.

In the depicted examples, environment 100 is an environment in which use of devices, such as mobile phones, is undesirable. Environment 100 may be, for example, without limitation, a courtroom, an aircraft cabin, a classroom, a movie theater, or some other location in which the use of radio frequency generating devices may be undesirable. In operation, user 104 may move about within environment 100 with radio frequency sensing apparatus 102 to identify users with radio frequency generating devices.

Radio frequency sensing apparatus 102 detects radio frequency signals transmitted over a selected frequency range with different signal strengths. This frequency range may be, for example, a range of radio frequency communications employed by mobile phones. Of course, other ranges may be used or selected depending on the particular implementation.

As user 104 moves about environment 100, radio frequency sensing apparatus 102 generates a varying audio frequency output in response to detecting a radio frequency transmission detected in environment 100. The output may change in pitch as the radio frequency signals change in amplitude. This radio frequency transmission may be radio frequency transmission 122, generated by mobile phone 116. As user 104 moves closer to mobile phone 116 with radio frequency sensing apparatus 102 and thus encounters a higher signal strength, the audible signal changes in pitch.

This audible signal may be heard by user 104 through a speaker system that includes a loud speaker and/or headphone. The audible signal changes in pitch as user 104 moves closer or farther away from the signal. In this manner, the use of an audible indicator allows user 104 to perform other tasks without requiring the use of sight by user 104. Of course, other indicators also may be included, such as a visual indication of the presence of the signal as well as the strength of the signal.

In this manner, radio frequency sensing apparatus 102 may be used to detect radio frequency devices that are turned on and emitting radio frequency signals. In particular, radio frequency sensing apparatus 102 may be used to detect users who have radio frequency generating devices that are actively transmitting data or signals. Radio frequency sensing apparatus 102 also may be used to detect the presence of radio frequency devices that are turned on. For example, mobile phone 116 may emit periodic signals to register and/or indicate its presence to a communications network. These radio frequency signal emissions may be detected by radio frequency sensing apparatus 102.

Figure 2:
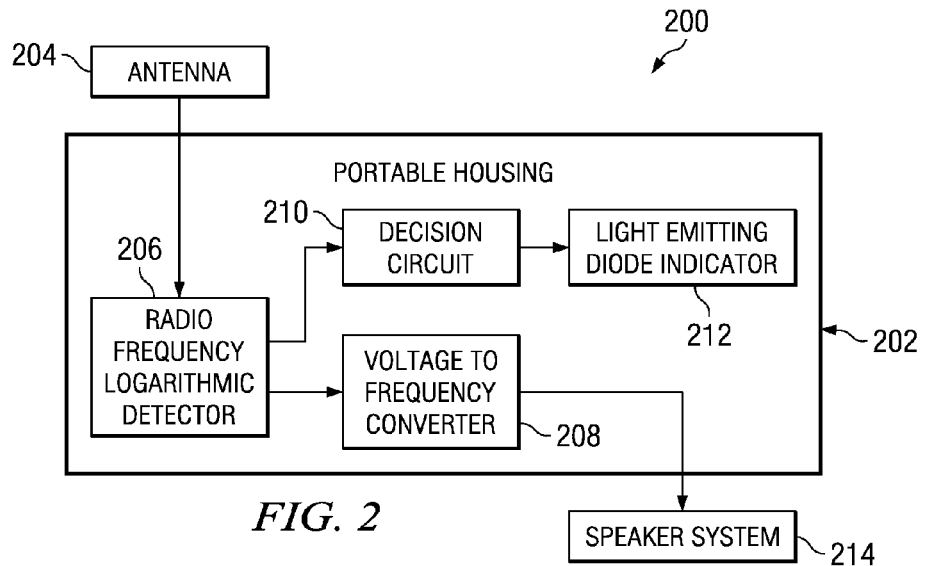
FIG. 2 is a block diagram of a radio frequency detector in accordance with an advantageous embodiment.

Turning now to FIG. 2, a block diagram of a radio frequency detector is depicted in accordance with an advantageous embodiment. In this example, radio frequency sensing apparatus 200 is an example of one implementation of radio frequency sensing apparatus 102 in FIG. 1. As depicted, radio frequency sensing apparatus 200 includes portable housing 202, antenna 204, radio frequency logarithmic detector 206, voltage-to-frequency converter 208, decision circuit 210, light emitting diode indicator unit 212, and speaker system 214.

In these examples, all the components except for speaker 214 and antenna 204 are located within portable housing 202. In this example, speaker system 214 takes the form of a headset, which is external to portable housing 202. In other embodiments, speaker system 214 may be within portable housing 202 as a loud speaker. Likewise, antenna 204 may be within an unshielded form of portable housing 202 or outside if portable housing 202 shields the internal circuitry from ambient radiation. Portable housing 202, in these examples, is any structure that may be carried by a user. In many cases, portable housing 202 may be held in the hand or pocket of a user.

Antenna 204 receives radio frequency signal waveforms that may be generated by various radio frequency generating devices. In these examples, antenna 204 is an omnidirectional antenna. Radio frequency logarithmic detector 206 generates a direct current (DC) voltage in response to radio frequency signals being received by antenna 204. In these examples, radio frequency detector 206 generates a voltage proportional to the logarithm of the received signal strength.

Radio frequency logarithmic detector 206 may be implemented using various logarithmic detector circuits. One example of a logarithmic detector microcircuit chip that may be used to implement radio frequency logarithmic detector 206 is a device having a part number of AD8313, which is available from Analog Devices, Inc. AD8313 is a logarithmic detector controller that generates a logarithmic voltage in response to receiving a radio frequency signal.

Voltage-to-frequency converter 208 is a circuit that converts the direct current voltage from the logarithmic detector into an audio frequency signal of pitch that varies with input voltage. In these examples, voltage-to-frequency converter 208 may generate a frequency modulated waveform at an audio frequency in response to a direct current voltage generated by radio frequency logarithmic detector 206. Voltage-to-frequency converter 208 also may be implemented using various available circuits and may otherwise be referred to as a voltage (or current) controlled audio oscillator or function generator. For example, voltage-to-frequency converter 208 may be implemented using a component having a part number of ICL8038, which is available from Intersil Corporation or a part number LM555, which is available from National Semiconductor Corporation.

Alternately, part number LM331 also available from National Semiconductor Corporation and part number ADVFC32 available from Analog Devices, Inc are precision voltage-to-frequency converters which output a train of narrow pulses rather than a symmetrical waveform and so require an additional circuit to increase audible energy. In particular, a frequency divider circuit generates a square wave or other symmetrical waveform that is more readily audible than the pulses generated by an LM331 or an ADVFC32 voltage-to-frequency converter alone. Any frequency divider circuit or chip providing the function of forming a symmetrical or nearly 50% duty cycle waveform from a pulsed input may be appended to any voltage-to-frequency converter with a pulsed output in order to emulate the performance of an ICL8038 to form voltage-to-frequency converter 208.

In these examples, voltage-to-frequency converter 208 outputs the audio frequency electrical signal that is presented using speaker system 214. Speaker system 214 may output an audible tome that has a pitch that varies as the strength of the signal varies. Speaker system 214 may be, for example, a speaker integrated within portable housing 202. In other embodiments, speaker system 214 may be a headset or ear buds worn by a user or any other electrical to audio transducer.

In these examples, a user may hear radio frequency emissions as changes in audio frequency or pitch. The audio frequency may increase as the user moves or becomes closer to the source of the radio frequency signal.

In these examples, light emitting diode unit 212 is an optional component that may be included in addition to speaker system 214 to provide additional indications of the presence of radio frequencies. Light emitting diode unit 212 may include decision circuitry 210 to activate one or more light emitting diodes in response to detection of a radio frequency signal by radio frequency logarithmic detector 206. Of course, other types of visual indicators may be used, such as, for example, without limitation, an LCD display.

FIG. 2 is shown for purposes of illustrating an implementation of advantageous embodiment and is not meant to imply architectural limitations on the manner in which different advantageous embodiments may be implemented. For example, radio frequency sensing apparatus 200 also may include additional circuitry to remove background noise such that output to speaker system 214 only occurs when radio frequency signals that meet some threshold criteria, frequency range, and/or pattern are detected. This type of processing may be implemented using different components, such as, for example, a processor, an application specific integrated circuit, or some other suitable component.

Figure 3:
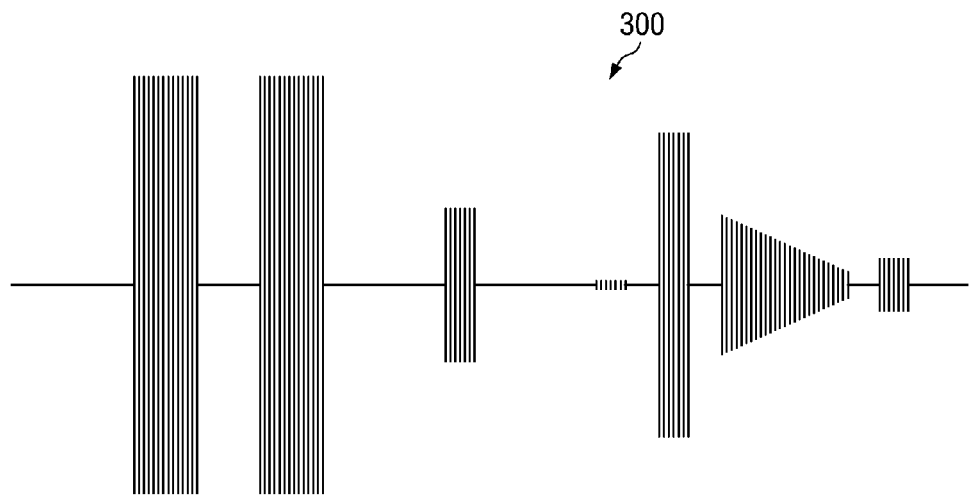
FIG. 3 is a diagram of a radio frequency waveform in accordance with an advantageous embodiment.

FIGS. 3-6 illustrate various wave forms that are processed using radio frequency sensing apparatus 200 in FIG. 2. Turning first to FIG. 3, a diagram of a radio frequency waveform is depicted in accordance with an advantageous embodiment. In this example, radio frequency waveform 300 is an example of a waveform that may be received by antenna 204 in FIG. 2. Radio frequency waveform 300 is input into radio frequency logarithmic detector 206. In response to receiving radio frequency waveform 300, radio frequency logarithmic detector 206 generates a voltage as an output.

Figure 4:
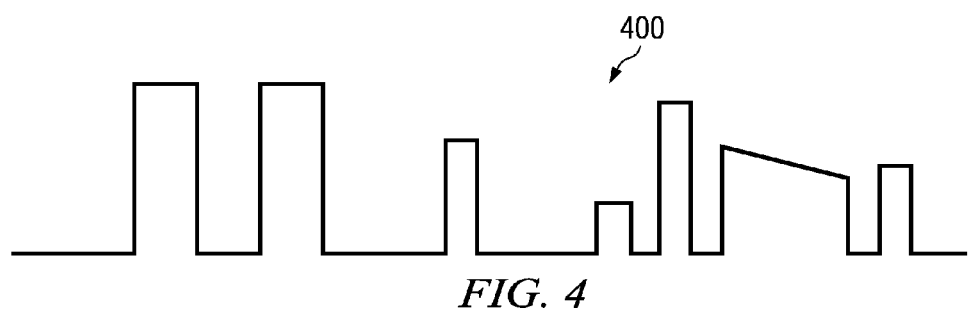
FIG. 4 is a compressed direct current voltage waveform generated by a radio frequency detector in accordance with an advantageous embodiment.

FIG. 4 is a compressed direct current voltage waveform generated by a radio frequency logarithmic detector in accordance with an advantageous embodiment in response to the waveform 300 in FIG. 3. In this example, compressed direct current voltage waveform 400 is an output generated by radio frequency logarithmic detector 206. This waveform is a logarithmic output in these examples. Compressed direct current voltage waveform 400 is input into voltage-to-frequency converter 208 in these examples.

With reference now to FIG. 5, a train of frequency pulses is depicted in accordance with an advantageous embodiment with a voltage-to-frequency converter of a type that outputs narrow pulses. Pulse waveform 500 illustrates a train of pulses generated in response to compressed direct current voltage waveform 400 in FIG. 4 being input to voltage-to-frequency converter 208. Pulse waveform 500 requires additional processing to generate a waveform with higher audible energy.

With reference to FIG. 6, an example of an output waveform is depicted in accordance with an advantageous embodiment. Output waveform 600 is the direct output of a voltage-to-frequency converter of a type with a symmetrical output or may be the output generated by a frequency divider circuit in response to receiving pulse waveform 500 in FIG. 5. In these examples, output waveform 600 is input into speaker system 214 to generate the audible tone heard by an operator of radio frequency sensing apparatus 200.

With reference to FIGS. 7-11, examples of alternative voltage-to-frequency converters are depicted in accordance with advantageous embodiments. These examples include two types that provide symmetrical waveforms and two more types that provide trains of narrow pulses.

Figure 7:
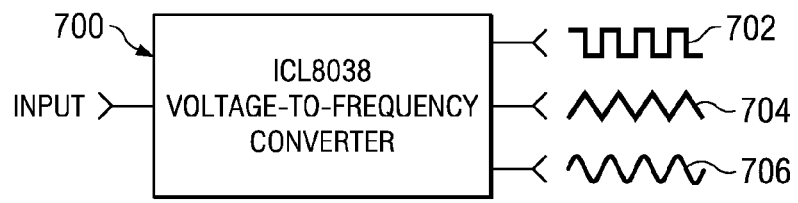
FIGS. 7-11 illustrate alternative voltage-to-frequency converters in accordance with advantageous embodiments.
Figure 8:
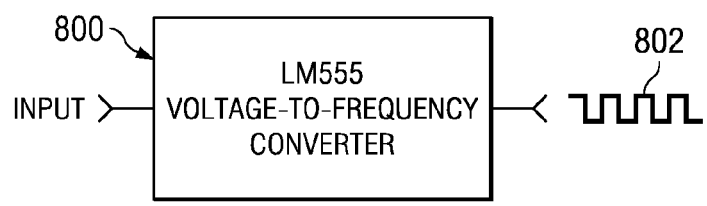
Figure 9:
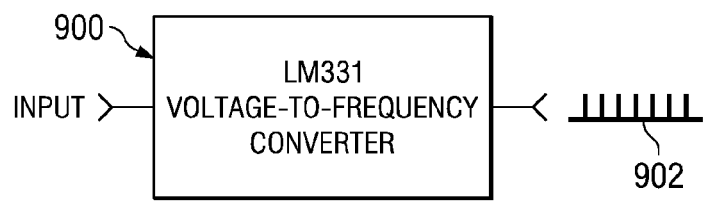
Figure 10:
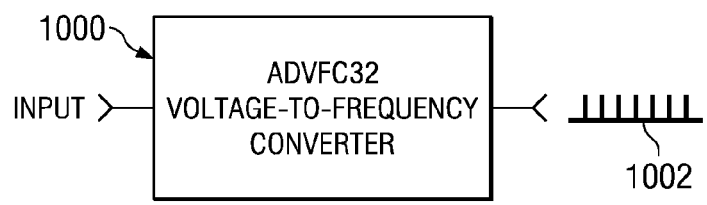

In FIG. 7, microcircuit device 700 is a voltage-to-frequency converter that has a part number of ICL8038. This device generates a number of different types of symmetrical waveform. Microcircuit device 700 may generate signal 702, which has a square waveform. Signal 704 has a triangular shaped waveform, while signal 706 is a sine waveform. In FIG. 8, microcircuit device 800 is a voltage-to-frequency converter chip having a part number of LM555. This device generates signal 802, which has a square waveform as an output. In FIG. 9, microcircuit device 900 is a voltage-to-frequency converter that has a part number of LM331. Output 902 takes the form of pulses. These pulses are narrow in shape. In FIG. 10, microcircuit device 1000 is a voltage-to-frequency converter having a part number of ADVFC32. This device generates narrow pulses 1002.

Figure 11:
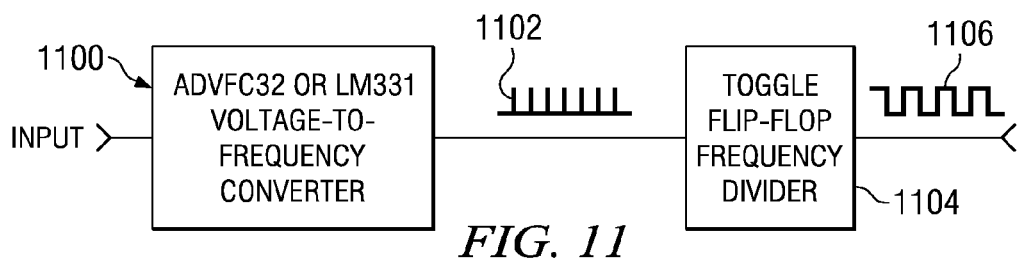

Symmetrical waveforms and other high duty cycle waveforms provide very much more audible energy when coupled to a speaker system 214. FIG. 11 finally depicts the use of a frequency divider to convert waveforms of narrow pulses to symmetrical waveforms with high audio energy. In this example, microcircuit device 1100 is a voltage-to-frequency converter, which may have a part number of ADVFC32 or LM331, in these examples. Chip 1100 generates output 1102, which takes the form of pulses. These pulses may be input into circuit 1104, which may take the form of a toggle flip-flop or a frequency divider. Output 1106 from circuit 1104 takes the form of a square waveform.

Figure 12:
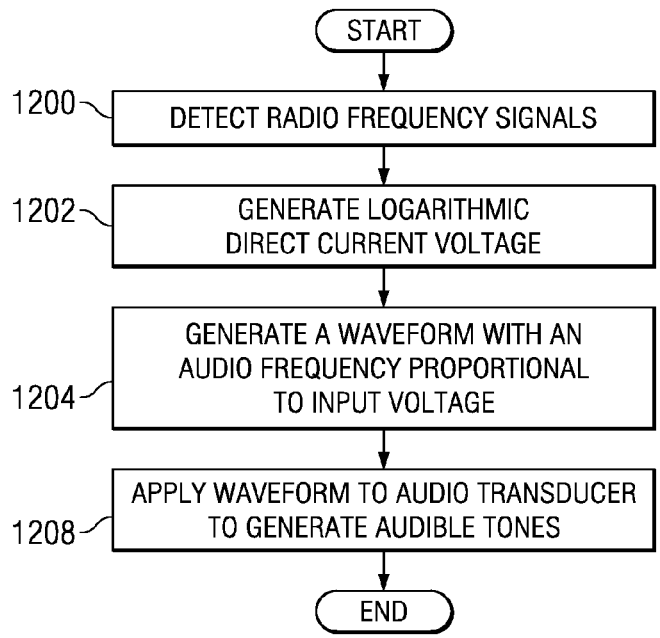
FIG. 12 is a flowchart of a process for detecting radio frequency signals in accordance with an advantageous embodiment.

Turning now to FIG. 12, a flowchart of a process for detecting radio frequency signals is depicted in accordance with an advantageous embodiment. The process illustrated in FIG. 12 may be implemented using radio frequency sensing apparatus 200 in FIG. 2. This process may generate different audible tones that may be sensed by an operator.

The process begins by detecting radio frequency signals (operation 1200). These radio frequency signals are detected by a radio frequency detector, such as radio frequency logarithmic detector 206 in FIG. 2.

The detection process of radio frequency logarithmic detector 206 in FIG. 2 generates a logarithmic direct current voltage from the detected radio frequency signals (operation 1202). The radio frequency logarithmic detector compresses the input dynamic range of the radio frequency signals to a narrower direct current voltage range. This direct current voltage may, for example, range from around 0.5 volts to 1.7 volts, depending on the particular implementation.

The process generates an audio frequency waveform from the logarithmic direct current voltage to form an electrical signal of varying frequency (operation 1204). In these examples, operation 1204 may be performed by a voltage-to-frequency converter, such as voltage-to-frequency converter 208 in FIG. 2. The audio frequency signal is then output to an electrical-to-audio transducer device (operation 1208), with the process terminating thereafter. In these examples, the audible tone may be output using speaker system 214 in FIG. 2.

Figure 13:
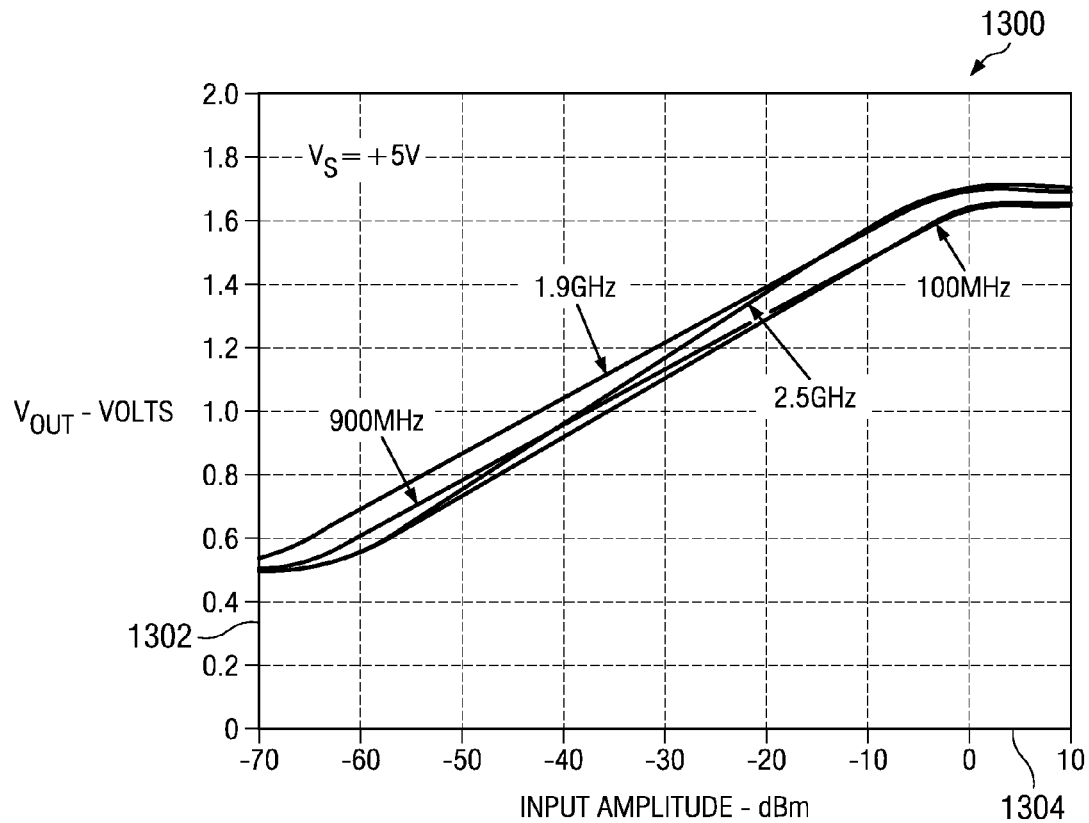
FIG. 13 is an output from a radio frequency detector in accordance with an advantageous embodiment.

Turning now to FIG. 13, an output from a radio frequency logarithmic detector is depicted in accordance with an advantageous embodiment. In this example, graph 1300 illustrates the logarithmic response of a radio frequency logarithmic detector in the form of AD8313. Graph 1300 illustrates the direct current voltage output generated by AD8313 on Y axis 1302 in response to different input radio frequency signal amplitudes on X axis 1304.

Thus, the different advantageous embodiments provide a method and apparatus for sensing radio frequency emissions from different devices. A radio frequency strength measuring apparatus may convert a radio frequency signal to an audible tone. This type of apparatus may comprise a radio frequency detector capable of detecting radio frequency signals over a selective frequency range with varying signal strength and capable of outputting a logarithmic voltage that varies with change of field strength.

Additionally, the apparatus may include a voltage-to-frequency converter connected to the radio frequency detector. This converter is capable of producing an audio frequency signal with frequency varying in accordance with input voltage. A speaker system is connected to the voltage-to-frequency converter circuit to output audio tones.

In this manner, a user may carry this apparatus and listen for deviations in the pitch of the tone to sense the presence of radio frequency emitting devices, such as wireless laptop computers and mobile phones. This apparatus further aids in determining the location of such devices. The strength of the signals from these devices also may be identified. This device may be used to detect other types of radio frequency generating devices, such as, for example, a personal digital assistant, a wireless transmitter, a Bluetooth headset, or some other similar device. Further, this apparatus may be used in various locations, such as a classroom, movie theater, courtroom, church, aircraft cabin, or some other area or environment in which use of radio frequency transmission devices may be undesirable.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different embodiments illustrate the use of a radio frequency detector that generates a logarithmic voltage, other types of radio frequency detectors may be used depending on the implementation. For example, the output may not be a logarithmic voltage in some embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A radio frequency strength sensing apparatus that converts a sensed radio frequency signal to an audible tone, the radio frequency strength sensing apparatus comprising:
    a radio frequency detector capable of detecting radio frequency signals over a selected frequency range with different signal strengths and capable of outputting a logarithmic voltage that varies with signal amplitude change of a detected radio frequency signal;
    a voltage-to-frequency converter circuit connected to the radio frequency detector and capable of producing an electrical signal waveform in the audio frequency range to generate the audible tone; and
    a speaker system connected to the voltage-to-frequency converter circuit, wherein the speaker system outputs the audible tone, wherein the speaker system outputs the audible tone in a manner that varies a pitch of the audible tone as the strength of the detected radio frequency signal varies.

2. The radio frequency strength sensing apparatus of claim 1, wherein the speaker system is one of a loudspeaker and a headphone.

3. The radio frequency strength sensing apparatus of claim 1 further comprising:
    an antenna connected to the radio frequency detector.

4. The radio frequency strength sensing apparatus of claim 1, wherein the antenna is an omni-directional antenna.

5. The radio frequency strength sensing apparatus of claim 1, wherein the radio frequency detector is a logarithmic detector circuit.

6. The radio frequency strength sensing apparatus of claim 1 further comprising:
    a portable housing, wherein the radio frequency detector and the voltage-to-frequency converter circuit are located within the portable housing.

7. The radio frequency strength sensing apparatus of claim 1, wherein the selected frequency range includes radio frequencies generated by at least one of a mobile phone, a wireless laptop computer, a personal digital assistant, and a wireless transmitter.

8. An apparatus comprising:
    a radio frequency detector capable of detecting radio frequency signals over a selected frequency range with different signal strengths and capable of outputting a logarithmic voltage that varies with signal amplitude change of a detected radio frequency signal;
    a voltage-to-frequency converter circuit connected to the radio frequency detector and capable of producing an audible tone; and
    a speaker system connected to the voltage-to-frequency converter circuit, wherein the speaker system outputs the audible tone, wherein the speaker system outputs the audible tone in a manner that varies a pitch of the audible tone as the strength of the detected radio frequency signal varies.

9. The apparatus of claim 8 further comprising:
    an antenna connected to the radio frequency detector.

10. The apparatus of claim 9, wherein the antenna is an omni-directional antenna.

11. The apparatus of claim 9, wherein the apparatus is a handheld or portable apparatus.

12. The apparatus of claim 8, wherein the selected frequency range includes radio frequencies generated by at least one of a mobile phone, a wireless adapter for a laptop computer, a personal digital assistant, and a wireless transmitter.

13. A method for detecting radio frequency signals, the method comprising:
    detecting a radio frequency signal within a selected frequency range to form a detected signal;
    generating a logarithmic voltage that varies with signal amplitude change of the detected signal to form an output voltage;
    converting the output voltage into an audio signal indicating a presence of the radio frequency signal; and
    converting the output voltage into the audio signal, wherein a varying pitch of the audio signal indicates the presence and a strength of the radio frequency signal.

14. The method of claim 13 further comprising:
    outputting the audio signal using a speaker system.

15. The method of claim 14, wherein the speaker system is a headset.

16. The method of claim 13, wherein the selected frequency range includes radio frequencies generated by at least one of a mobile phone, a wireless laptop computer, a personal digital assistant, and a wireless transmitter.

17. The method of claim 13 further comprising:
    visually indicating the detected signal by activating at least one light-emitting-diode.

* * * * *